(12) United States Patent
Leupe et al.

(10) Patent No.: US 6,915,736 B2
(45) Date of Patent: Jul. 12, 2005

(54) BALER CALCULATING DEVICE

(75) Inventors: Dirk G. C. Leupe, Roeselare (BE); Christiaan A. C. Lippens, Sint-Laurens (BE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 10/116,960

(22) Filed: Apr. 8, 2002

(65) Prior Publication Data

US 2002/0174781 A1 Nov. 28, 2002

Related U.S. Application Data

(62) Division of application No. 09/605,560, filed on Jun. 29, 2000, now Pat. No. 6,474,228.

(51) Int. Cl.$^7$ .............................................. B30B 15/30
(52) U.S. Cl. .............................. 100/45; 100/51; 100/99; 100/100; 100/215; 700/17
(58) Field of Search ............................. 100/43, 45, 50, 100/51, 99, 87, 100, 215, 218; 56/10.2 R, 10.2 A, 10.2 G, 14.7; 700/17, 28, 44, 45, 46; 702/137, 176

(56) References Cited

U.S. PATENT DOCUMENTS

| | | | |
|---|---|---|---|
| 4,106,267 A | | 8/1978 | White |
| 4,106,268 A | * | 8/1978 | White et al. ...................... 56/1 |
| 4,118,918 A | * | 10/1978 | White .......................... 56/341 |
| 4,135,444 A | * | 1/1979 | White et al. ................... 100/50 |
| 4,624,179 A | * | 11/1986 | Yves et al. ....................... 100/4 |
| 4,624,180 A | * | 11/1986 | Strosser ......................... 100/41 |
| 4,924,405 A | * | 5/1990 | Strosser et al. ................. 700/17 |
| 5,123,338 A | * | 6/1992 | Mathis .......................... 100/43 |
| 5,131,214 A | * | 7/1992 | Vermeer ................... 56/10.2 R |
| 5,224,328 A | | 7/1993 | Viaud |
| 5,226,356 A | * | 7/1993 | Schrag et al. ................... 100/41 |
| 5,557,510 A | * | 9/1996 | McIntyre et al. .............. 700/17 |
| 5,752,374 A | | 5/1998 | Allworden et al. |
| 5,913,801 A | | 6/1999 | Bottinger et al. |
| 6,050,074 A | * | 4/2000 | Clostermeyer ................ 56/341 |
| 6,474,228 B1 | | 11/2002 | Leupe et al. |
| 6,543,342 B2 | | 4/2003 | Leupe et al. |
| 6,553,902 B2 | | 4/2003 | Leupe et al. |
| 6,786,143 B2 | | 9/2004 | Leupe et al. |

FOREIGN PATENT DOCUMENTS

| | | |
|---|---|---|
| DE | 198 29 276 A1 | 1/2000 |
| EP | 1 066 747 A1 | 1/2001 |

* cited by examiner

*Primary Examiner*—Allen Ostrager
*Assistant Examiner*—Jimmy T Nguyen
(74) *Attorney, Agent, or Firm*—Collin A. Webb; John William Stader

(57) ABSTRACT

A baler is described which has a collection chamber or duct and a baling chamber. Crop material enters the duct until a pre-determined level has been reached at which time a stuffer transfers the pre-compressed crop to the baling chamber. A control system is provided for calculating the ratio between the amount of crop material which should be formed into bales under optimal conditions and the rate of flow of crop material entering the duct. This ratio can be displayed and used to control the speed of the towing vehicle. The present invention uses the duct as a kind of measuring cylinder to determine the rate at which crop material is entering the baler.

4 Claims, 8 Drawing Sheets

BALER CALCULATING DEVICE

This application is a division of application Ser. No. 09/606,560, filed Jun. 29, 2000, now U.S. Pat. No. 6,474,228.

BACKGROUND OF INVENTION

1. Field of Art

The present invention relates generally to an apparatus and a method for optimizing the operation of an agricultural baler, and more particularly to sensing the capacity at which the baler is operating. In particular the baler is adapted to determine the ratio between an optimum rate of production of packages of crop material formed in the baling chamber of the baler and the actual flow rate of material entering the baler from the field. The present invention also includes a control system and method for determining the capacity at which the baler is operating, for example for determining the ratio between an optimum rate of production of packages of crop material formed in the baling chamber of the baler and the flow rate of material entering the baler from the field. The invention has particular application to optimizing the normal operation of the baler under conditions when charges of crop material fed into the baler are varying, such as on fields where there is a non-uniform crop yield.

2. Description of Prior Art

Conventional agricultural balers comprise a frame pulled behind a tractor over the field and picking up therefrom hay, straw or silage grass and feeding such crop material to a baling chamber in which it is compressed to packages. In one type of known baler the packages are parallelepiped is shape and are formed under action of a plunger which reciprocates inside the baling chamber. When the packages have reached a predetermined length a tying mechanism is operated to encircle the completed package with a plurality of strands and to knot the strands ends together to form a finished bale which is then ejected out of the baler. A baler with display in the driver cabin with associated microprocessor for a monitoring and control system for the baler is described, for example, in U.S. Pat. No. 4,624,180.

Commonly the baling chamber comprises a reciprocating plunger which is thrust against the package when a new charge of crop material is introduced into the chamber. To feed crop material into the chamber a crop pick-up assembly is provided with closely spaced tines located at ground level which feed the crop from the field into a duct. Optionally, the crop fed into the duct may be cut to a suitable size, for example, by feeding the crop through a set of knives. Ideally, the crop should be pre-compressed in the duct into uniform amounts of crop before it is transferred to the baling chamber. This may be achieved by packer forks which partly compress the crop against a restraint placed at the end of the duct Oust before the baling chamber). A stuffer mechanism transfers the pre-compressed crop into the baling chamber when adequate material is available in the duct. There are several ways that the correct transfer time can be determined, e.g. one known way is by means of a sensor which indicates when a pre-determined pressure has been achieved in the duct. Ideally, the packer operates continuously while the stuffer mechanism only operates when adequate material is present. In this way, unnecessary movement of the stuffer mechanism is avoided and equal amounts of crop are transferred to the baler chamber.

The drive for an agricultural baler is typically taken from a power take-off (PTO) at the rear of the tractor. Other than this energy source, other sources such as hydraulic power may be optionally provided from the tractor or generated on the baler from the PTO using a hydraulic pump. The PTO drive mechanism is used to drive all of the components of the baler. These components are activated at different times. Typically, the plunger will be operated at so many operations per minute, whereas the stuffing mechanism only operates when the crop in the duct has reached the correct pressure. To prevent the baler jamming it is necessary to co-ordinate the operation of the stuffing mechanism and the plunger. For instance, the stuffer mechanism should be inhibited if the plunger is not in a start position (thus, leaving the entrance to the baler chamber free). The stuffing mechanism is conventionally driven through a one-revolution clutch, i.e. once activated the drive clutch makes one revolution and then stops awaiting a further activation. The clutch drive for the stuffing mechanism operates when two criteria are fulfilled: when the crop density sensor has been activated and the plunger has returned to its start position. Depending on the rate of crop pick-up the ratio of plunger strokes to stuffer mechanism operations is an integer, e.g. 1, 2, 3. It is known to provide the driver of the tractor with an indication of this value. Examples of balers meeting the above description are the 4860 and 4880 big balers supplied by New Holland, N.V., Belgium.

One problem with the indication system described above is that it is limited to integer values. It would be advantageous to supply the driver with information of intermediate values if these are related to the actual amount of crop material being picked-up by the baler. This would allow the driver to adjust the speed of the tractor to optimize performance of the baler. In addition, no values below 1 are indicated to the driver. A value below 1 is an indication that more crop is being picked-up than can be baled under standard conditions, i.e. that sufficient crop material is ready in the duct (activation of first stuffer mechanism criterion) for the next stuffing operation before the plunger has returned to the start position (second stuffer mechanism criterion). This may not be a problem as some over-compression is tolerable. However, at some point the system is overloaded—usually resulting in the breaking of specially dimensioned shear bolts which are provided to prevent serious damage to the working components of the baler. However, replacing a shear bolt takes time and results in a lower efficiency.

As an alternative or addition to shear bolts, European Patent Application 876,752 describes the use of power-operated clutches. Monitoring of the operation of the baler is provided by sensors. If the revolution rate of a monitored operating element exceeds or falls below speed limits, the monitored operating element is switched off by activating the clutch. However, operating of the clutch stops operation of the relevant element so that efficiency must inevitably fall.

It is an object of the present invention, to provide an apparatus and method which allow the driver of a tractor pulling a baler to optimize the operation of the baler in a better way than is conventionally known.

SUMMARY OF THE INVENTION

According to an aspect of the present invention is an agricultural baler for driving by a towing vehicle, comprising a display device on the baler or for placement on the towing vehicle which provides a display of a value related to a ratio of an optimum rate at which the baler can compress the crop material into bales compared to the actual flow rate of crop material entering into the baler. Preferably, the ratio is displayed as integer and non-integer values or at least to one place of decimals.

According to another aspect of the present invention an agricultural baler is provided for driving by a towing vehicle, comprising a baling chamber. There is also a collection chamber for collecting crop material before delivery to the baling chamber; and a device for calculating a value relating to the amount or the rate of crop material entering the baler.

According to a further aspect of the present invention there is provided an agricultural baler, comprising a first chamber for receiving crop material and a charge sensor for sensing when a charge of crop material has filled the first chamber to a pre-determined degree of filling and for providing an output indicative of the completion of this filling. There is a first timer which is started when crop material begins entry into the first chamber and stops when it receives the output from the charge sensor. In a second baling chamber there is a plunger in the second baling chamber for compressing crop material transferred from the first chamber. A timing device provides a timing output relating to the rate of operation of the plunger. Finally, a calculating device for determining a ratio indicative of the time to fill the first chamber compared with the plunger cycle time from the outputs of the charge sensor and the timing device.

A further aspect of the present invention is a control system for an agricultural baler, comprising a device for determining a value related to a ratio of an optimum rate at which the baler can compress the crop material into bales compared to the actual flow rate of crop material entering into the baler. Preferably, the ratio is output as integer and non-integer values or at least to one place of decimals.

A further aspect of the present invention is a control system for an agricultural baler for driving by a towing vehicle, the baler comprising a baling chamber and a collection chamber for collecting crop material before delivery to the baling chamber. The control system comprising a device for calculating a value relating to the amount or rate of crop material entering the baler.

The present invention also includes a method of operating a baler comprising the steps of determining a value related to an optimum ratio of a rate at which the baler can compress the crop material into bales compared to the actual flow rate of crop material entering into the baler and displaying the ratio. Preferably, the display is as integer and non-integer values or at least to one place of decimals.

A further aspect of the present invention is a method of operating an agricultural baler for driving by a towing vehicle, the baler comprising a baling chamber and a collection chamber for collecting crop material before delivery to the baling chamber, the control system comprising the step of calculating the amount or rate of crop material entering the baler.

The present invention includes the use of a collection chamber of an agricultural baler to determine the rate at which crop material enters the baler.

The present invention is preferably used with a baler having a discontinuous stuffing mechanism. The present invention is particularly useful for use with an agricultural baler having a collection or pre-compression chamber and a discontinuous stuffing mechanism. By a discontinuous stuffing mechanism is meant one which only operates when the collection or pre-compression chamber has received a pre-determined amount of crop material. It is preferred if the display of the ratio increases in contrast with reducing value of the ratio. It is preferred if the increase of contrast is non-linear with reduction of the value of the ratio.

The dependent claims define further independent embodiments of the present invention. A baler and a control system therefor in accordance with the present invention will now be described in further detail, with reference to the following drawings.

DESCRIPTION OF THE ILLUSTRATIVE EMBODIMENTS

The present invention will be described with reference to certain embodiments and to certain drawings but the present invention is not limited thereto but only by the claims. For instance, the present invention will mainly be described with reference to a pre-compression chamber or duct located underneath the baling chamber but the present invention is not limited thereto but may be advantageously used with a pre-compression or collecting chamber above the baling chamber as is known, for instance, from U.S. Pat. No. 4,193,251 (but without the novel features of the present invention).

The terms "front", "rear", "forward", "rearward", "left", "right", "upward", and "downward" as used throughout this description are determined with respect to the normal direction of travel of the baler in operation and in its normal orientation unless otherwise stated. However they are not to be construed as limiting terms.

Figure 1:
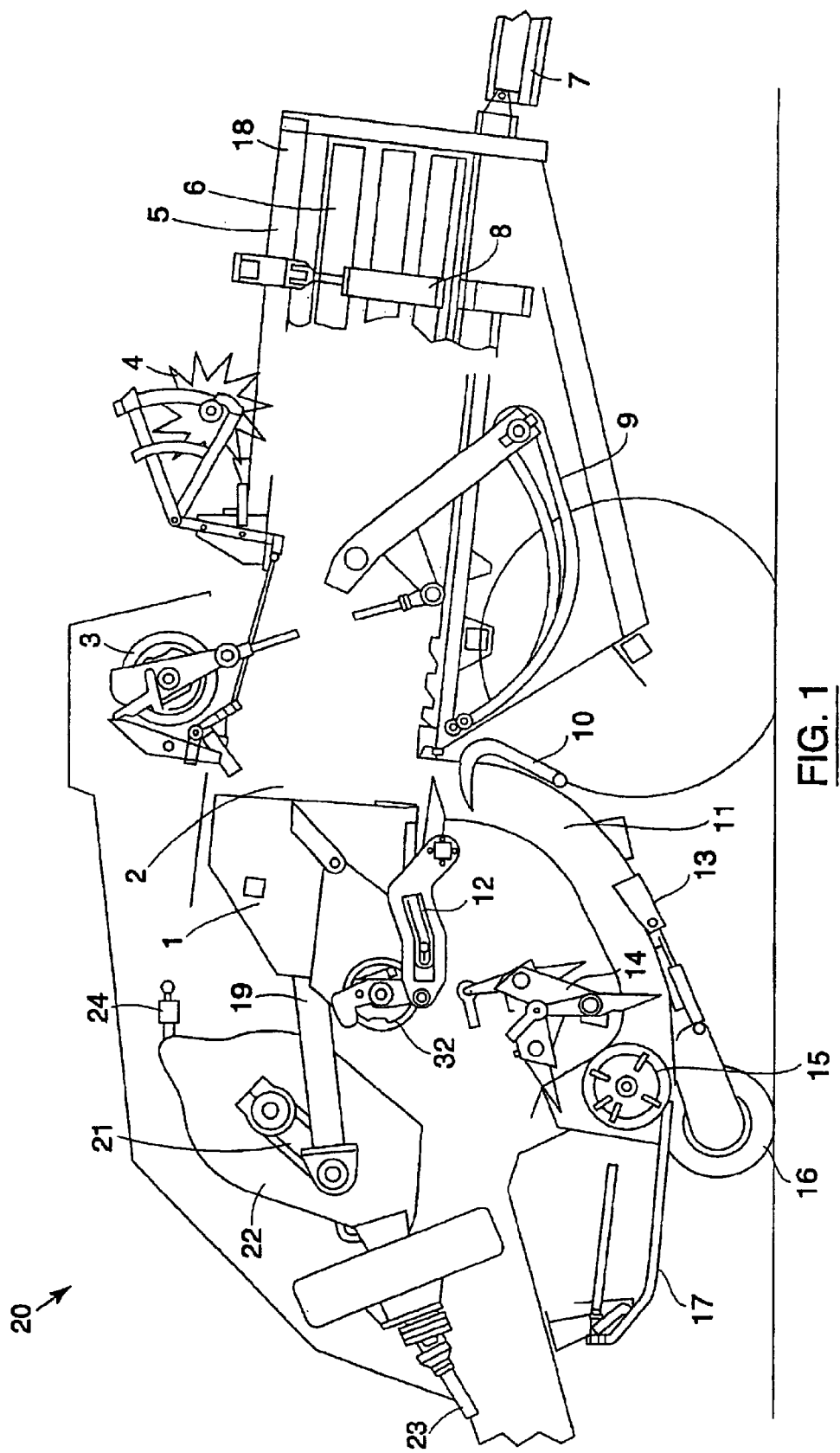
FIG. 1 is a side elevational view of an agricultural baler comprising a pick-up, a pre-compression duct, a stuffer and a baling chamber to which an embodiment of the present invention may be applied.

FIG. 1 shows an agricultural baler 20 comprising a frame or chassis which is equipped with a forwardly extending portion provided at its front end with a hitching device (not shown) for coupling the baler 20 to a towing vehicle, e.g. a tractor. A windguard 17 guides crop to a pick-up assembly 16 which lifts crop material off the field as the baler 20 travels thereover and delivers such material into the front end of a rearwardly and upwardly curved, charge-forming feeder duct 11 which acts as a pre-compression chamber for the crop material. The duct 11 communicates at its upper end with an overhead, fore-and-aft extending baling chamber 2 into which crop charges are loaded by a cyclically operating stuffer mechanism 12. A continuously operating packer mechanism 14 at the lower front end of the feeder duct 11 continuously feeds and packs material into the duct 11 so as to cause charges of the crop material to take on and assume the internal configuration of the duct 11 and to reach a degree of pre-compression prior to periodic engagement by the fork of the stuffer mechanism 12 and insertion up into the baling chamber 2. Crop is prevented from entering the baling chamber 2 by means of a crop holder or retainer 10, e.g. in the form of fingers which can rotate between a closed position (as shown) in which they block the duct 11 to an open position in which they allow crop to enter chamber 2. The feeder duct 11 is equipped with a sensor flap 13 for establishing whether a complete charge has been formed therein and the baler control system is adapted to operate the stuffer fork in response to the output of the sensor flap 13. Preferably, the flap arrangement constitutes a pressure sensor which is activated when the pressure of the crop in duct 11 has reached the required value. The activation pressure of sensor flap 13 may be adjustable. Each action of the stuffer mechanism 12 introduces a "charge" or "flake" of crop material from the duct 11 into the chamber 2.

A plunger 1 reciprocates in a fore-and-aft direction within the baling chamber 2 under action of a pair of pitman rods 19 which are linked to the crank arms 21 of a gearbox 22 driven by a transmission shaft 23 which is connected to the PTO shaft of the tractor. The reciprocating plunger 1 pushes each new charge introduced into the baling chamber 2 rearwardly and forms the subsequent charges into a package of crop material, which is forced by the same action of the plunger 2 toward a rearmost bale chute 7.

A rear baling chamber 18 is bounded by top and side moveable walls 5, 6 respectively which may be moved by an actuator, e.g. a hydraulic cylinder such as shown at 8 to vary the cross section of the outlet of the baling chamber. Reduction of this cross section will increase the resistance to rearward movement of the crop packages and hence increase the density of the crop material contained therein.

Before leaving the baling chamber 2, each package is securely bound in its final compacted form by a tying mechanism 3. The length of each bale produced by the baler 20 can be adjustably predetermined by conventional means. The length of the bale may be measured by a metering wheel 4 and the tying mechanism 3 may be activated based on the output of the metering wheel. The tying mechanism 3 may comprise a series of periodically actuated needles 9 which are normally stationed in a stand-by condition below the chamber 2 but which, when actuated, swing upwardly through and across the baling chamber 2 to present twine to a corresponding series of knotters positioned on top of the chamber 2 and distributed across the width of the latter.

Means such as hay dogs may be provided to retain the package of crop material after its compression by the plunger 1 in order to prevent forward expansion of the introduced charge of crop material while the plunger 1 is retracting.

When the stuffer mechanism 12 introduces a new charge of crop material into the baling chamber 2, it will be engaged by the plunger 1 and shoved rearwardly. At the end of the compression stroke, the plunger 1 retracts. The introduction of a fresh charge of crop material into the baling chamber 2 may be sensed by a suitable sensor. The magnitude of the force by which the crop material is compressed, may be measured by a load sensor 24 which is installed in-between the plunger gearbox 22 and the baler frame or chassis. The reaction forces from the package in the baling chamber 2 are transmitted via the plunger 1, the pitman rods 19 and the crank arms 21 to the gearbox 22 whose lower portion is bolted onto the baler frame. The reaction force at the top of the gearbox 22 is measured by the load sensor 24 thus providing an output signal proportional to the plunger forces. Such load sensor 24 may be of the type described in U.S. Pat. No. 5,123,338.

In accordance with the present invention a display is provided to the driver of the tractor which gives an indication of the capacity at which the stuffer mechanism and baler plunger is operating. To provide this display the present invention includes a first device and first method step for determining a first value related to the rate at which crop is being fed into the duct 11 as well as a second device and a second method step for determining a second value related to the cycling frequency or time period of the plunger 1. The present invention provides a third device and a third method step for providing the ratio of the first and second values or vice versa. This ratio is a value which provides an indication of the rate at which crop is being fed into the duct 11 compared with the ability of the stuffer mechanism to introduce the crop into the baling chamber. Hence, the present invention comprises a fourth device and a fourth method step for providing an indication of the rate at which crop is entering the baler 20 compared with an indication of an optimum rate at which the baler 20 can process the crop, i.e. it provides a value for the percentage of an optimum capacity at which the baler 20 is operating. In the above the words "device" and "method step" should be given their widest meanings and are not limited to individual or separate devices but must be seen functionally, a single device providing one or more of the first to fourth values and a "device" including a software program capable of carrying out the same function when the program is running on a suitable microprocessor and appropriate sensors providing the necessary inputs. In the above the word "ratio" should be understood to be a ratio not limited to integer values but including incremental values between the integer values, e.g. at least to a first place of decimals. There are many ways which will become apparent to the skilled person how the relevant values may be obtained on understanding the present invention as described above, e.g. from the actions of microswitches or proximity switches at appropriate positions, all of which methods and apparatus are included within the present invention.

Figure 2:
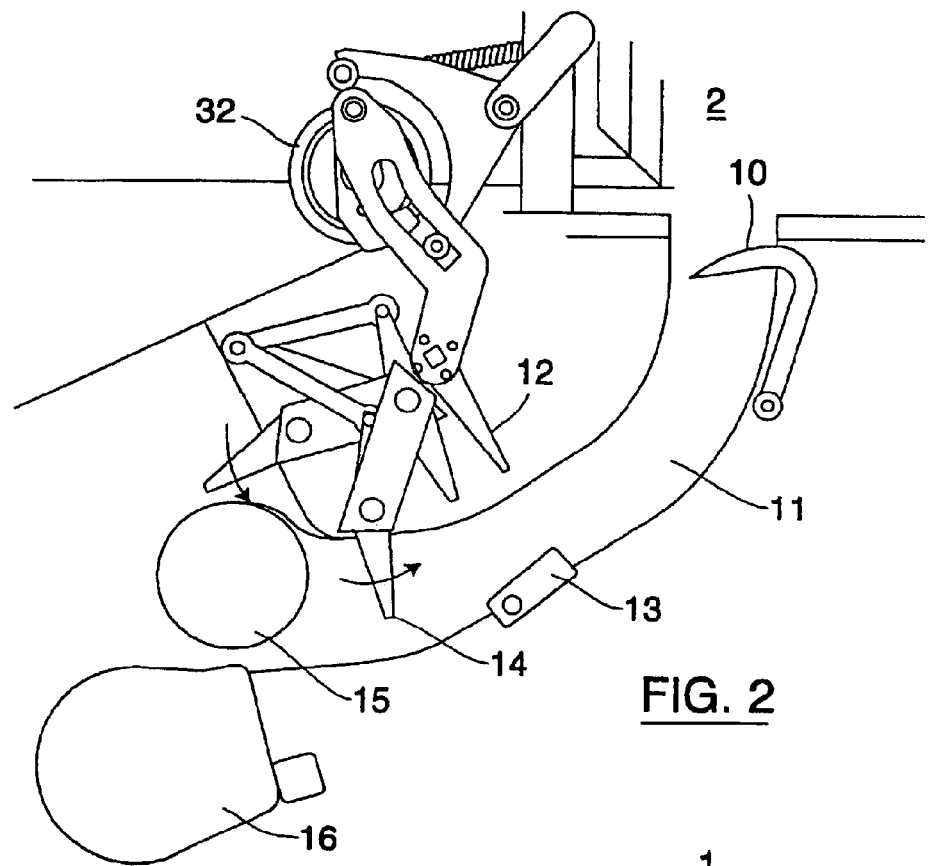
FIG. 2 is a detailed cross-sectional views of the baler of FIG. 1 showing the stuffer in the retracted position.
Figure 3:
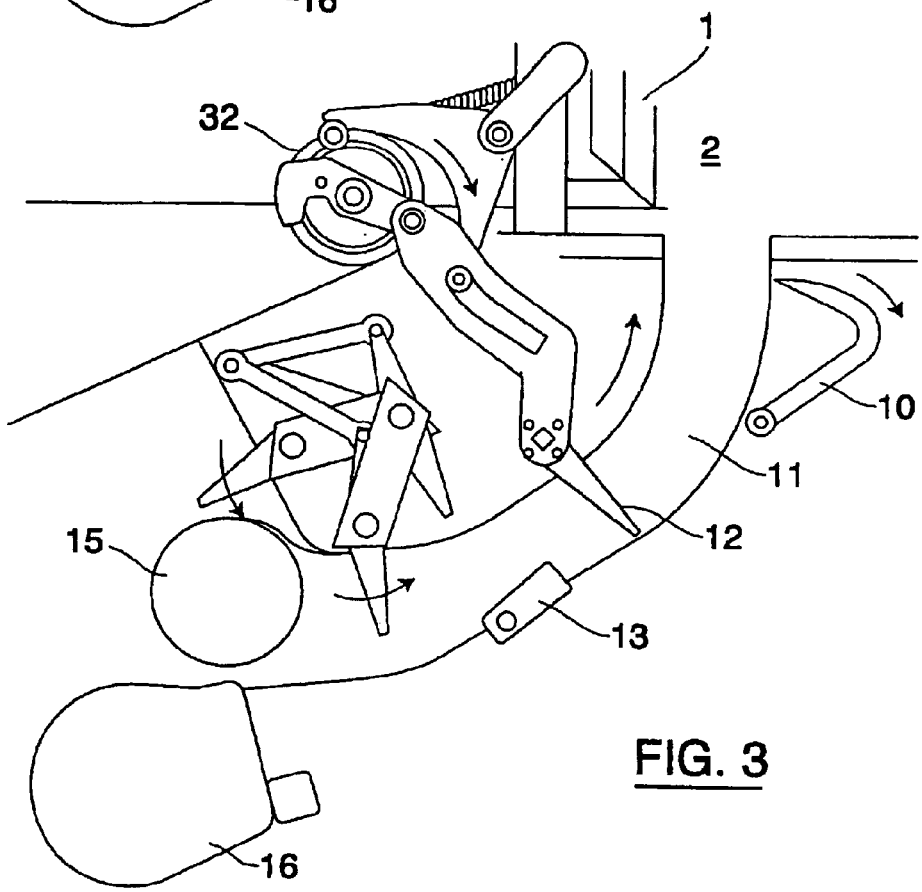
FIG. 3 is a further detailed view of the baler of FIG. 1 showing the stuffer beginning its sweep of the duct.

A first illustrative embodiment of the present invention will now be described with reference to FIGS. 2 to 7. FIG. 2 is a schematic cross-sectional detail view of a part of the baler 20 showing the duct 11. The crop holder 10 is in the closed position, the duct 11 is empty and the fork of the stuffer mechanism 12 is in its retracted position (not penetrating into duct 11). Let us assume that an amount of crop has just been transferred to the baler chamber 1 and the stuffer fork has just swept backwards into its retracted position. In accordance with an embodiment of the present invention the volume of duct 11 is used as a kind of measuring cylinder to determine a value related to the rate that crop is entering the baler 20. Accordingly, a first timer is provided to determine the time taken to fill the duct 11, from which time the rate of crop material entering the duct 11 can be calculated. The first timer may be started at the initial position shown in FIG. 2. The first timer may be triggered by any sensor which senses this position uniquely, e.g. it may triggered by a microswitch or proximity sensor which senses the closing of the crop holder 10 or the movement of the stuffer fork from its raised position to its retracted position or by the closing of sensor flap 13. In the embodiment shown in FIG. 5, the first timer is started by the signal from a sensor 31 which is generated upon the stuffer mechanism 12 emptying the duct 11. At this moment sensor flap 13 is cleared and returns to its home position. The first timer may be a discrete timer or may be the included in a microprocessor. A timer in accordance with the present invention is any device which measures the lapse of time in some arbitrary units. A clock in accordance with the present invention is a device which generates timing pulses which may be used by the timer to count time periods.

Crop is continuously picked-up and fed into the baler 20 by and over the pick-up assembly 16 as the baler 20 travels over the ground. Windguard 17 guides the crop into the baler 20. One or more centering augers 15 may optionally be provided to bring the material from the sides of the pick-up 16 to the inlet of the duct 11 to be grabbed by the packer mechanism 14 if this inlet is narrower than the pick-up 16. The packing device may also be provided by a rotor. The crop is continuously moved from the pick-up 16 into the precompression chamber formed by duct 11 by means of the packer 14 or a rotor. Crop holder 10 retains the crop in the duct 11. When sufficient crop has entered the duct 11 a pre-determined crop pressure is achieved which activates sensor flap 13. This activation stops the first timer let us say at a time Tf. This time Tf is the time taken for the crop to fill the duct 11 to the correct density, i.e. the inverse of this time Tf gives an indication of the rate at which the crop is entering the duct 11. A further sensor detects the movement of the plunger 1. This sensor may be placed on or close to the plunger 1 or anywhere on the drive mechanism of the plunger 1. For instance the sensor may be directed to the teeth of a gear in the plunger gearbox 22. In accordance with a preferred embodiment of the present invention, this sensor may be used as a clock means for generating clock pulses from part of the plunger drive mechanism. These clock pulses are used for the timers of the present invention for counting time periods. The sensor for providing clock pulses may be any suitable sensor such as an optical encoder attached to a shaft, gear or flywheel of the plunger drive mechanism, or a proximity sensor arranged to sense rotation of the same. A second timer for determining the cycle time of the plunger 1 is not necessary if the number Np of clock pulses generated by the clock means for one plunger cycle is known. Np is related to the cycle time of the plunger Tp, where Tp is Np times the time period of one clock pulse. Optionally and alternatively, a second timer may be provided which is started and stopped at the beginning and end of the plunger cycle or a fraction thereof. The second timer may be a discrete timer or may be included within a microprocessor. The certain number Np of clock pulses of the clock means or the second timer provides a value related to the time period of operation of the plunger 1, i.e. the time Tp. This time Tp is an indication of how fast the plunger is operating. The ratio of the two time periods Tf/Tp is an indication of how quickly the duct has received enough crop to pass to the plunger 1 compared with the time the plunger 1 requires to complete one cycle. Hence, if this value is 1, the baler 20 is operating such that the amount of crop material entering the baler 20 is exactly equal to an optimum amount of material the plunger mechanism 1 should process. If the value is below 1 it means that more material is entering than can be processed under optimum conditions. As more material is entering duct 11 than optimum there is a certain over-compression in duct 11. This does not mean the baler 20 will jam as a certain degree of over-compression is possible without fault. However, if the ratio falls below a certain fraction, an overload on the stuffer mechanism 12 will occur. By providing a display of this ratio to the driver, he/she can tell at what capacity the baler 20 is being driven and how close the baler 20 is to an overload.

Once sensor flap 13 has tripped it automatically activates the stuffer mechanism 12. This does not mean that the stuffer mechanism 12 operates immediately as the stuffer mechanism 12 must wait (if necessary) until the plunger 1 is back in its retracted position which leaves the mouth of the duct 11 open. If both criteria are fulfilled, crop holder 10 is moved out of the way (see FIG. 3) and stuffer mechanism 12 descends into the duct 11 behind the crop material that is pre-compressed therein. Stuffer mechanism 12 now sweeps the crop material into the baling chamber 2 immediately behind the retracted plunger 1. Note that time may have elapsed since sensor flap 13 was activated (duct filled to optimal level) as the time at which the stuffer mechanism 12 clears the duct 11, is synchronised not only with the sensor flap 13 but also with the plunger 1. During this time the packer mechanism 14 feeds more crop into the duct 11 resulting in a certain amount of over-compression. This will not always cause a problem as crop materials are compressible and the baler 20 is preferably designed to withstand pressures and weights in excess of optimum conditions.

Figure 4:
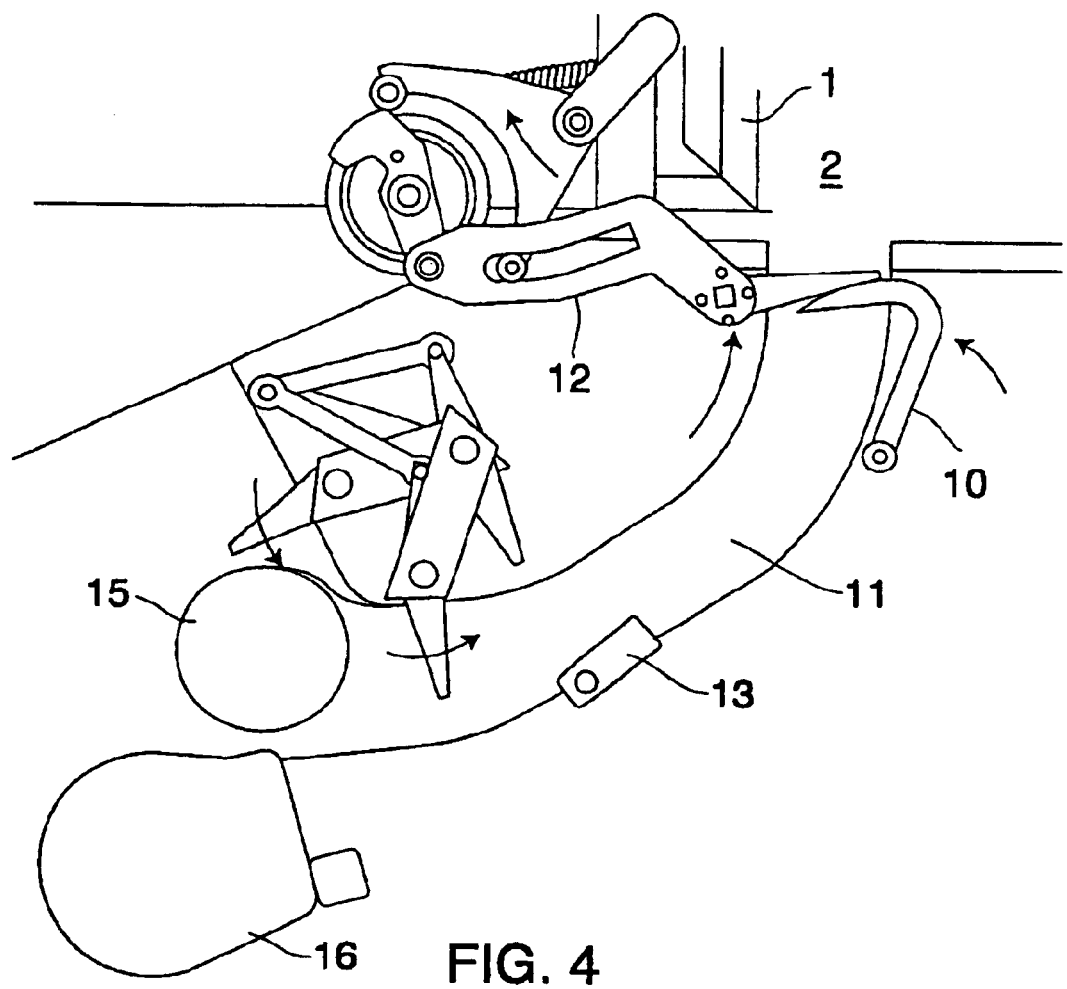
FIG. 4 is a further detailed view of the baler of FIG. 1 as the stuffer has completed its sweep of the duct.
Figure 5:
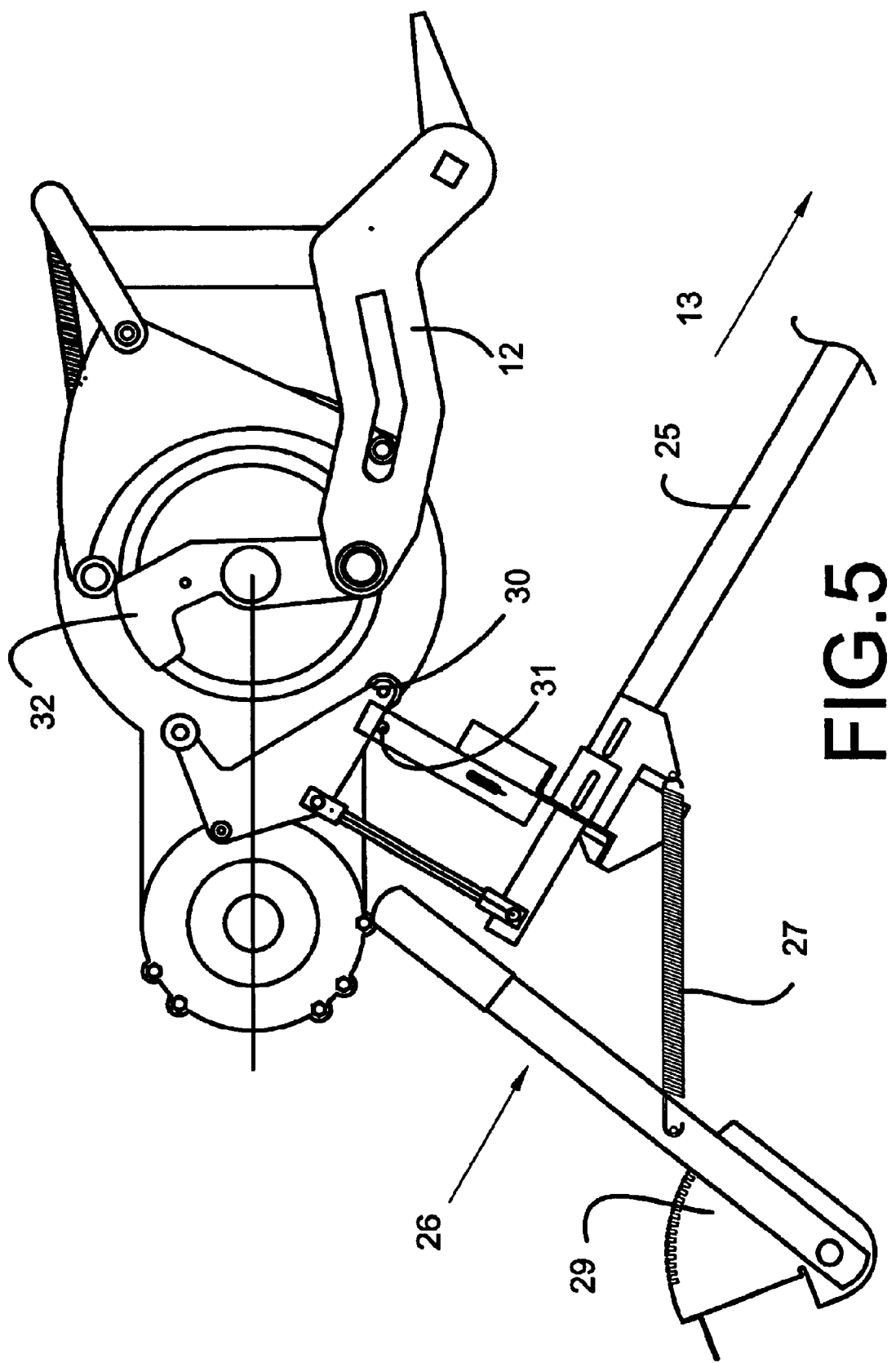
FIG. 5 is a detailed view illustrating a sensor in accordance with an embodiment of the present invention which may be used to determine the time to fill the duct with crop material.

As shown in FIG. 4, once the stuffer fork has reached its maximum movement in the direction of the baling chamber 2, all the crop is fed into the chamber 2. The stuffer fork then returns to the initial position as shown in FIG. 2 and the crop holder 10 is closed. The stuffing cycle as described above continues.

The formation, compression, knotting and discharge of the bale from the baling chamber 2 are not expected to be limitations on the present invention and will not be described in detail.

As indicated above, there are many ways in which the sensor and timer operations may be performed in accordance with the present invention. One embodiment will be described with reference to FIG. 5. Rod 25 is attached to the sensor flap 13 on the underside of duct 11. As sensor flap 13 opens due to the pressure of the crop, it pulls rod 25 against the force of spring 27. When the force on the flap 13 exceeds the spring load, rod 25 moves towards the bottom right of the figure. The force exerted by spring 27 may be adjusted by moving lever 26 forwardly or backwardly and fixing the selected position on the ratchet mechanism 29. Movement of this rod 25 rotates clockwise the trip arm 30 of the one revolution clutch 32 which drives the stuffer mechanism 12. The stuffer mechanism 12 is driven continuously from the gearbox 22 but the stuffer fork is only operated when the one revolution clutch 32 engages. If the plunger 1 is also in the retracted position the one revolution clutch 32 engages for one revolution and drives the stuffer fork through its sweep to move crop material into baling chamber 1. If the plunger 1 is not in the retracted position the one-revolution clutch 32 waits until the plunger 1 is retracted before it engages.

A sensor 31 detects the rotational movement of the trip arm 30. When the trip arm 30 rotates, the sensor 31 is activated, e.g. it makes or breaks a contact or sends a signal to a microprocessor. This is the signal for the first timer to stop. The trip arm 30 only returns to its upper position when the stuffer mechanism 12 has cleared duct 11 and sensor flap 13 has returned to its closed position. The switch 31 also detects this movement and provides the appropriate signal (e.g. make/break or sends a signal) which is the trigger for the first timer to restart. Thus, in accordance with this embodiment a single sensor 31 is used to provide two of the method steps (the first and second) described above and provides the function of the first and second devices mentioned above.

Figure 6:
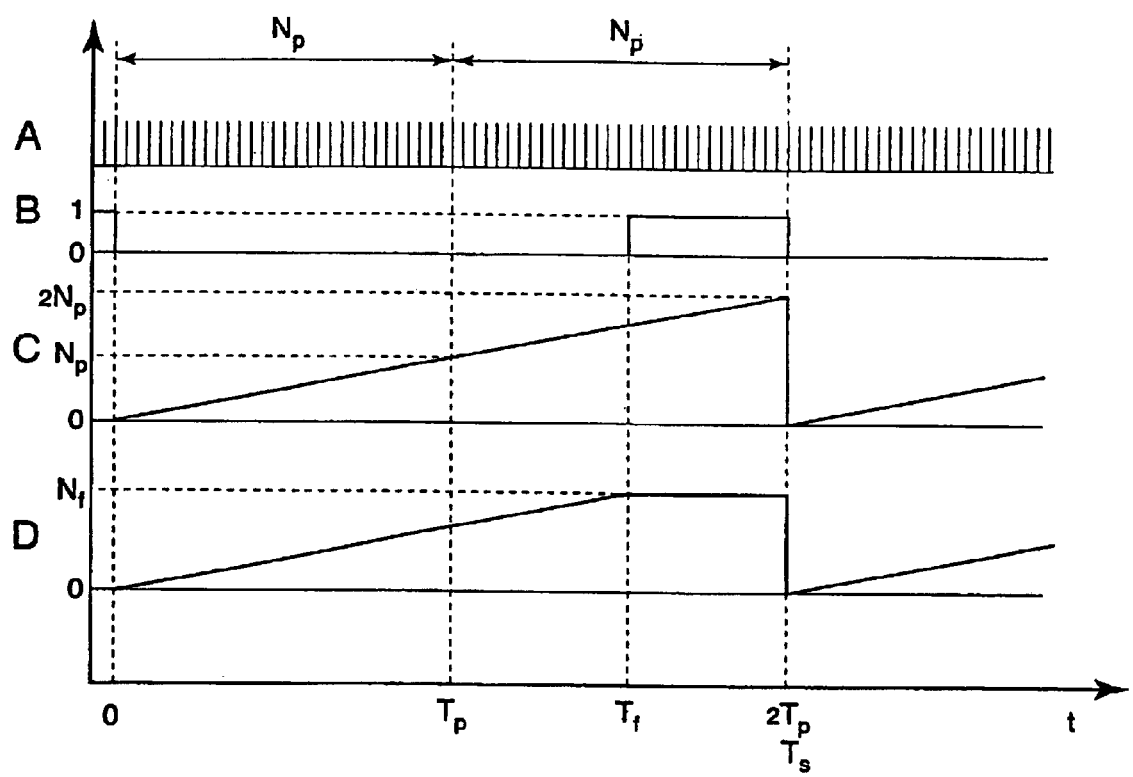
FIG. 6 is a diagram showing timings in accordance with an embodiment of the present invention.

Operation of the above baler 20 will now be described with reference to FIGS. 6 and 7. A series of timing pulses shown at A is generated from the sensor measuring the operation rate of the plunger 1. For example, 68 pulses may be generated for one plunger cycle. This value of Np is stored. The output of the sensor 31 is shown at B. When the stuffer mechanism clears the duct 11 sensor flap 13 closes and the output from sensor 31 drops to zero. This starts the first timer. As shown at B, when the duct 11 is full with an optimum amount of crop material, sensor flap 13 opens which results in the output of sensor 31 going positive. The number of pulses of A between the drop and rise of the signal from the sensor 31(B) is stored, i.e. Tf in terms of a number Nf of clock pulses shown from A. In the example shown in FIG. 6, Tf is greater than Tp but less than 2 Tp. The ratio of Nf/Np is calculated and displayed for the driver, this ratio representing the ratio between the rate at which crop material can be processed by the baler 20 under optimum conditions and the rate of crop material entering the duct 11. Instead of displaying the instantaneous value of Nf/Np, the average of a certain number of cycles (e.g. the last 5) may be calculated and displayed. The present invention also includes the calculation of a running average of Nf/Np where the running average is calculated from a combination of the instantaneous value of Nf/Np and one or more previous values of Nf/Np or previous average values of Nf/Np, whereby the instantaneous value may be modified by a weighting factor.

Figure 7:
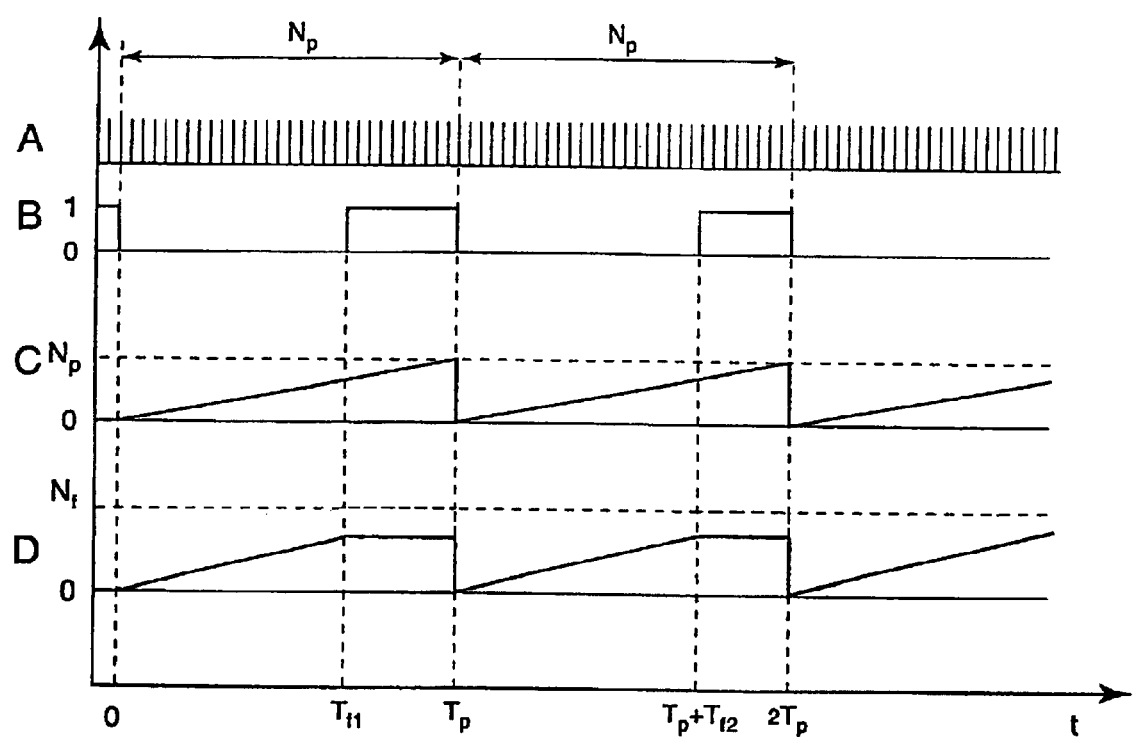
FIG. 7 is a diagram similar to FIG. 6 but for a higher rate of crop material entering the collection duct.

An alternative situation is shown in FIG. 7. Here Tf is less than Tp, i.e. more material enters duct 11 than can be processed by the baler 20 under optimum conditions. In this case the ratio Nf/Np is less than 1.

Figure 8:
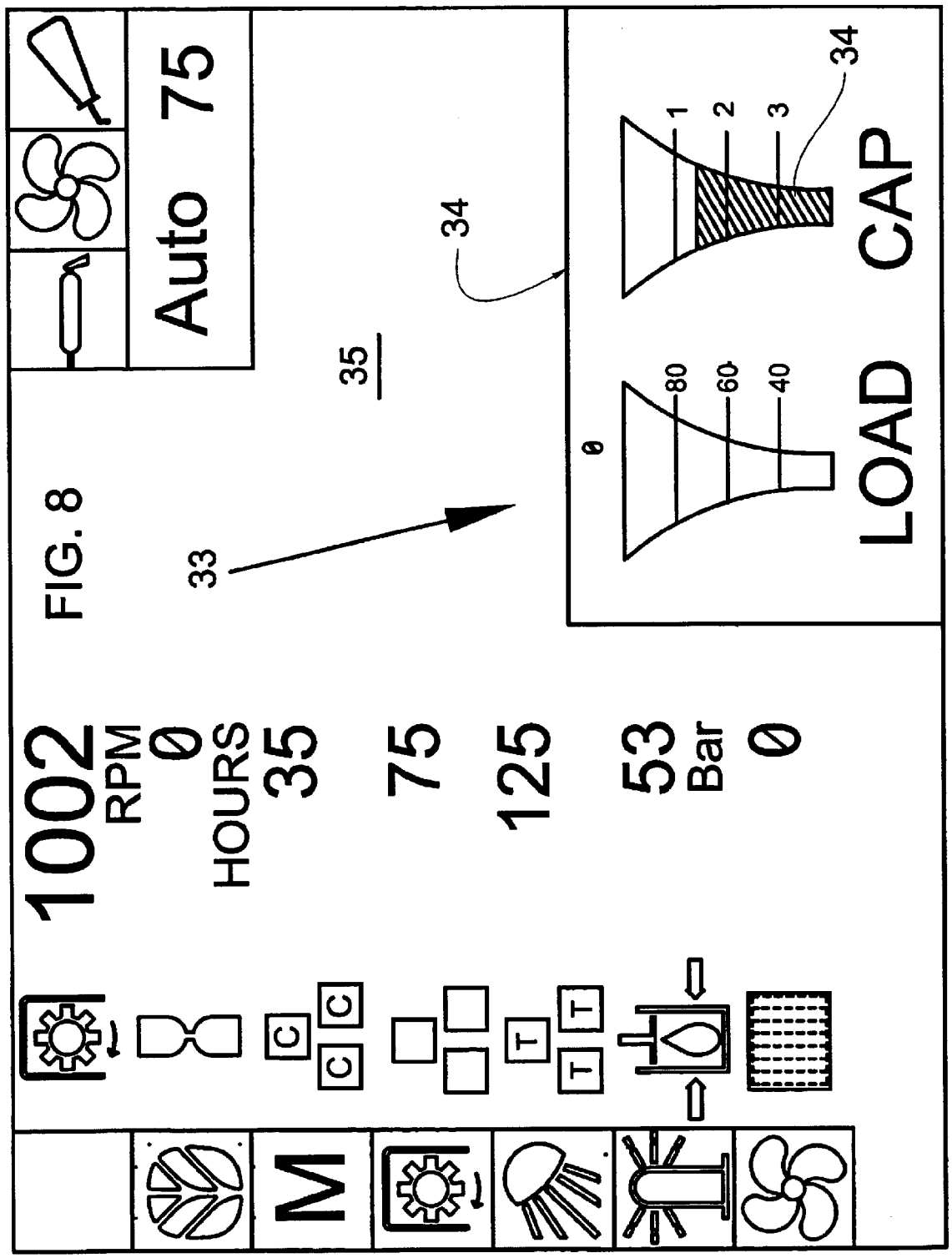
FIG. 8 shows a schematic view of a display in accordance with an embodiment of the present invention.

A display 35 for the driver of the tractor is shown schematically in FIG. 8. It may be an LCD display as conventionally used in tractor cabins or similar and may be driven by a microprocessor. The microprocessor receives the inputs from the sensors, e.g. the sensors for determining Tf and Tp and determines the ratio of these and displays this in field 34. The ratio will generally be between 1 (or a little below 1) and 3, i.e. between the time period Tf for filling of the duct 11 being about equal to the plunger time period Tp, and the plunger operating three times before the duct 11 is full. The ratio may be calculated exactly by a microprocessor so not only integer values are displayed but also intermediate values, e.g. to one decimal place. Preferably, the display 34 includes a region 36 whose contrast increases as the value of the ratio Nf/Np decreases. This is shown in FIG. 8 as a black or dark-coloured area 36 against a light-coloured background, whereby the area of the display 36 increase as the ration Nf/Np decreases. Contrast may be increased by the use of different colours. Preferably, contrast is increased by increasing the area associated with each incremental reduction in the value of the ratio Nf/Np. Preferably, the increase in contrast is non-linear with the reduction in the ratio Nf/Np. The display 35 may include other signs and alarms, e.g. the plunger load may be displayed in field 33 as sensed by sensor 24.

Figure 9:
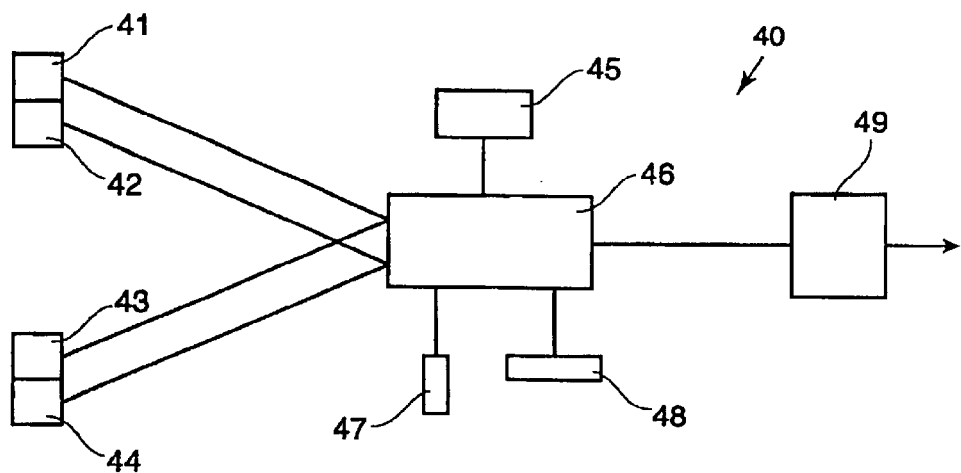
FIG. 9 is a schematic circuit diagram of a sensing system in accordance with an embodiment of the present invention.

A control system 40 in accordance with an embodiment of the present invention is shown schematically in FIG. 9. It comprises a plurality of sensor means 41 to 44, a microprocessor 46, a display 45 and optional audio and visual alarms 47 and 48. The display 45 may be mounted in the towing vehicle (which is preferred) or on the baler 20. The sensor means 41 provides timing pulses relating to the speed of operation of the plunger (pulses A of FIGS. 6 and 7). Alternatively and optionally sensor means 41 determines when the plunger 1 begins a cycle and sensor means 42 determines when it ends a cycle. The sensor means 42 is not an essential functionality for operation of the present invention. The sensor means 43 determines when the stuffer mechanism 12 ends a cycle (start of the filling of the duct 11) and sensor means 44 determines when the duct 11 has been filled to the correct level, i.e. determines when sensor flap 13 is activated. Although separate sensor means 41–44 are shown these do not necessarily relate to physical sensors but only to functions which are carried out by one or more sensors. The outputs from the sensor means 41–44 are supplied to the microprocessor 46 which may include a clock or counter. Microprocessor 46 determines the relevant cycle times from the outputs of sensor means 41–44 as has been described with reference to FIGS. 6 and 7, for instance, from the time difference between the activation of sensor means 43 and 44, the time Tf to fill duct 11 to an optimum level is calculated. The number Np of pulses for a plunger cycle is pre-stored. Alternatively and optionally, the time difference between the activation of sensor means 41 and 42 is used to calculate the time period Tp of the plunger 1. The microprocessor 46 then calculates a value relating to the ratio Tf/Tp and displays this on the display 45. Typically, the plunger 1 operates at several tens of strokes per minute, e.g. 42 strokes per minute so that the ratio Tf/Tp can be calculated every few seconds.

The driver of the towing vehicle can use the display 45 to optimise operation of the baler 20. If the display shows the ratio of Tf/Tp to be just above an integer, e.g. 2.1, this means that the duct 11 is not quite full as the plunger 1 starts its third stroke. The stuffer mechanism 12 must wait almost a complete period before it can operate. Meanwhile the packer mechanism 14 keeps adding crop to crop material already present in the duct 11. This results in an inefficient operation. To correct, the driver should attempt to operate slightly under an integer value so as to obtain a more constant performance or a more uniform bale. An optical alarm 48 or audio alarm 47 may sound when the baler starts to operate in a region just above an integer value of the above ratio. Further, to obtain an optimum performance it is best to operate with the ratio of Tf/Tp just below 1 as then the plunger 1 receives crop material at each stroke. With a constant revolution rate of the PTO the baler 20 operates with a constant plunger stroke frequency. To reach the optimal operation the driver increases the speed of the towing vehicle to take in more crop from the field per unit of time.

To avoid over stressing the baler components the driver avoids a region of the ratio Tf/Tp below a certain fraction, e.g. 0.4. At this point 2.5 times as much crop material as optimum is packed into duct 11 before the stuffer mechanism 12 sweeps the crop material into the chamber 2. Let us assume that any more over-compression will cause a shear bolt to break or a power clutch of the stuffer mechanism 12 to operate. When the ratio Tf/Tp gets close to 0.4, say at 0.5 the driver may be warned by an optical or audible alarm 48, 47 of impending difficulties. At the ratio 0.4 the microprocessor 46 may activate a regulator 49 for controlling the power clutch in order to safeguard the baler 20.

Figure 10:
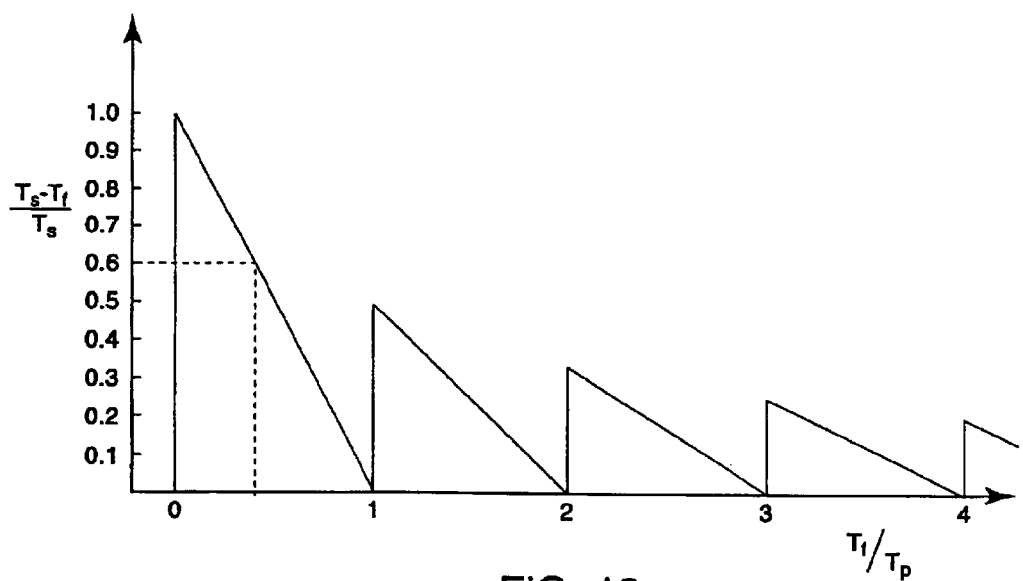
FIG. 10 shows a graph of the ratio $(T_S-T_f)/T_S$ plotted against the ratio $T_f/T_p$ in accordance with an embodiment of the present invention.

A second embodiment of the control system in accordance with the present invention will now be described with reference to FIGS. 9 and 10. In this embodiment only sensor means 43 and 44 are required. Let us assume the cycle time of the stuffing mechanism 12 is Ts. This time can be obtained from the time difference between two consecutive operations of sensor means 43 and is shown in FIGS. 6 and 7 in graph B. It is the time between two consecutive signal changes to zero from the sensor flap 13 (B of FIGS. 6 and 7). The time to fill the duct 11 Tf is determined from the difference in time between activation of sensor means 43 and 44. This activation is shown in graph B in FIGS. 6 and 7, the activation of sensor means 43 being the drop of the signal from the sensor flap 13 and the activation of sensor means 44 being the raising of the signal from sensor flap 13. The delay Td from when the duct is full and when the stuffer mechanism 12 operates can be calculated from the difference between Ts and Tf. The microprocessor then calculates the ratio (Ts−Tf)/Ts. This ratio is the delay time from filled duct 11 to stuffer operation divided by the cycle time of the stuffer mechanism 12. A graph of this ratio plotted against the output ratio Tf/Tp of the previous embodiment is shown in FIG. 10. It can be seen that at a value of ratio Tf/Tp of just over an integer, the value of (Ts−Tf)/Ts is high. For example, at Tf/Tp=1.1, the ratio of (Ts−Tf)/Ts is 0.45. Below a Tf/Tp ratio of 1, the value of (Ts−Tf)/Ts rises steadily. Taking the limit of Tf/Tp=0.4 from the previous embodiment, this is equivalent to a ratio of (Ts−Tf)/Ts of 0.6. Hence there is a unique range between 0.5 and 0.6 for the ratio (Ts−Tf)/Ts in which the baler is operating absolutely at maximum load. The driver speeds up the towing vehicle passing through the various zones of FIG. 10 until the region of (Ts−Tf)/Ts=0.5 to 0.6 which may then be used to control the speed of the towing vehicle.

In a further embodiment of the present invention which represents a further stage of automation and communication between the baler 20 and the towing vehicle, the baler capacity data can be used to control the speed of the towing vehicle. For instance, the speed of the towing vehicle may be reduced automatically in cases of threatening overload. This may be achieved by the regulator 49 of FIG. 9 which responds to an appropriate signal from the microprocessor 46 to reduce the speed of the towing vehicle, e.g. by acting directly on the fuel flow rate. The baler capacity data is preferably communicated to the towing vehicle via a standard bus system, e.g. a controller are network (CAN) bus. The baler capacity data may include the ratio (Ts−Tf)/Ts and/or the ratio Tf/Tp.

It will be appreciated that if the range of Tf/Tp is less than one, the ratio (Ts−Tf)/Ts is equal to 1−Tf/Tp as the stuffing cycle time is the same as the plunger cycle time. Hence, at least within the range Tf/Tp is less than one, the control parameter for this embodiment, i.e. the ratio (Ts−Tf)/Ts, relates to a value which gives an indication of the ratio of the amount of crop material processable by the baler 20 under optimum conditions and the amount of crop material entering the baler 20.

While the invention has been shown and described with reference to preferred embodiments, it will be understood by those skilled in the art that various changes or modifications in form and detail may be made without departing from the scope and spirit of this invention.

The present invention will be described with reference to certain embodiments and to certain drawings but the present invention is not limited thereto but only by the claims. For instance, the present invention will mainly be described with reference to a pre-compression chamber or duct located underneath the baling chamber but the present invention is not limited thereto but may be advantageously used with a pre-compression or collecting chamber above the baling chamber as is known, for instance, from U.S. Pat. No. 4,193,251 (but without the novel features of the present invention).

It will be obvious to those skilled in the art that various changes may be made without departing from the scope of the invention and the invention is not to be considered limited to what is illustrated in the drawings and described in the specification.

What is claimed is:

1. An agricultural baler for driving by a towing vehicle, comprising:

a baling chamber;

a collection chamber for collecting crop material before delivery to said baling chamber; and a device for calculating a value relating to the amount or rate of crop material entering the baler;

a charge sensor for sensing when a charge of crop material has filled said collection chamber to a pre-determined degree of filling and for providing an output indicative of the completion of this filling;

a first timer which is started when crop material begins entry into said collection chamber and stops when it receives the output from said charge sensor;

a plunger in said baling chamber for compressing crop material transferred from said collection chamber; and a timing device providing a timing output relating to a rate of operation of said plunger;

a first calculating device for determining a ratio from the outputs of said charger sensor and said timing device, said ratio being indicative of the time to fill said collection chamber compared with the time the plunger requires to complete a cycle.

2. The baler according to claim 1, further comprising a control system including said first calculating device, and a display associated with said control system for displaying said ratio.

3. The baler of claim 2, wherein said display of the ratio increases in contrast with reducing value of said ratio.

4. The baler of claim 3, wherein said increase of contrast is non-linear with reduction of the value of said ratio.

* * * * *